(12) United States Patent
Dufournier

(10) Patent No.: US 6,860,146 B2
(45) Date of Patent: Mar. 1, 2005

(54) METHOD AND SYSTEM OF DETECTION OF A RUN-FLAT CONDITION OF A TIRE; INSERTS, WHEELS AND TIRES DESIGNED FOR SUCH METHOD AND SYSTEM

(75) Inventor: Arnaud Dufournier, Clermont-Ferrand (FR)

(73) Assignee: Michelin Recherche et Technique, S.A., Granges-Paccot (CH)

(*) Notice: Subject to any disclaimer, the term of this patent is extended or adjusted under 35 U.S.C. 154(b) by 168 days.

(21) Appl. No.: 09/754,981

(22) Filed: Jan. 5, 2001

(65) Prior Publication Data

US 2001/0025679 A1 Oct. 4, 2001

Related U.S. Application Data

(63) Continuation of application No. PCT/EP99/04464, filed on Jun. 28, 1999.

(30) Foreign Application Priority Data

Jul. 6, 1998 (FR) .............................................. 98 08655

(51) Int. Cl.⁷ ........................................... G01M 17/02
(52) U.S. Cl. ........................................ 73/146; 340/444
(58) Field of Search ................................ 73/146, 146.2, 73/146.3; 340/425.5, 438, 442–444

(56) References Cited

U.S. PATENT DOCUMENTS

| | | | | |
|---|---|---|---|---|
| 3,594,555 A | * | 7/1971 | Klein et al. .................... | 701/71 |
| 3,776,043 A | * | 12/1973 | Welk, Jr. ...................... | 73/490 |
| 3,805,034 A | * | 4/1974 | Klein et al. .................... | 701/71 |
| 4,262,724 A | | 4/1981 | Sarkissian .................... | 152/330 |
| 4,463,347 A | * | 7/1984 | Seko et al. ................... | 340/576 |
| 5,749,982 A | | 5/1998 | Muhlhoff et al. | |
| 5,760,682 A | | 6/1998 | Liu et al. ..................... | 340/444 |
| 5,783,991 A | | 7/1998 | Jones .......................... | 340/444 |
| 5,891,279 A | | 4/1999 | Lacour | |
| 6,034,595 A | * | 3/2000 | Yanase ........................ | 340/444 |
| 6,039,099 A | | 3/2000 | Muhlhoff ..................... | 152/158 |
| 6,094,978 A | | 8/2000 | Battocchio et al. ......... | 73/146.2 |
| 6,118,369 A | * | 9/2000 | Boesch ........................ | 340/443 |
| 6,397,670 B1 | * | 6/2002 | Dufournier et al. ........... | 73/146 |

FOREIGN PATENT DOCUMENTS

| | | |
|---|---|---|
| EP | 0796747 | 9/1997 |
| EP | 0844111 | 5/1998 |
| FR | 2713558 | 6/1995 |
| FR | 2762260 | 10/1998 |
| GB | 2045903 | 11/1980 |
| WO | 9403338 | 2/1994 |

OTHER PUBLICATIONS

English language Abstract for JP 54 083 201 (Jul. 3, 1979).
English language Abstract for JP 05 065 004 (Mar. 19, 1993).
English language Abstract for JP 10 151 920 (Jun. 9, 1998).
U.S. Appl. No. 09/418,283, "Safety Insert Generating a Transverse Vibrating Signal and Device for Sensing the Tire Bearing on the Insert", filed Oct. 14, 1999.

* cited by examiner

Primary Examiner—Edward Lefkowitz
Assistant Examiner—Jermaine Jenkins
(74) Attorney, Agent, or Firm—Fitzpatrick, Cella, Harper & Scinto

(57) ABSTRACT

A method of detection of a run-flat condition of a vehicle tire, said tire being mounted on a wheel, wherein:

a quantity $f(\alpha, t)$ is sensed, which varies which the angular displacement of the wheel in time;
measuring signals are elaborated, which vary with the angular speed of the wheel $d\alpha(t)/dt$;
a quantity characteristic of the dispersion of measuring signals is calculated;
an alarm is set off when the characteristic quantity satisfies a given ratio.

14 Claims, 11 Drawing Sheets

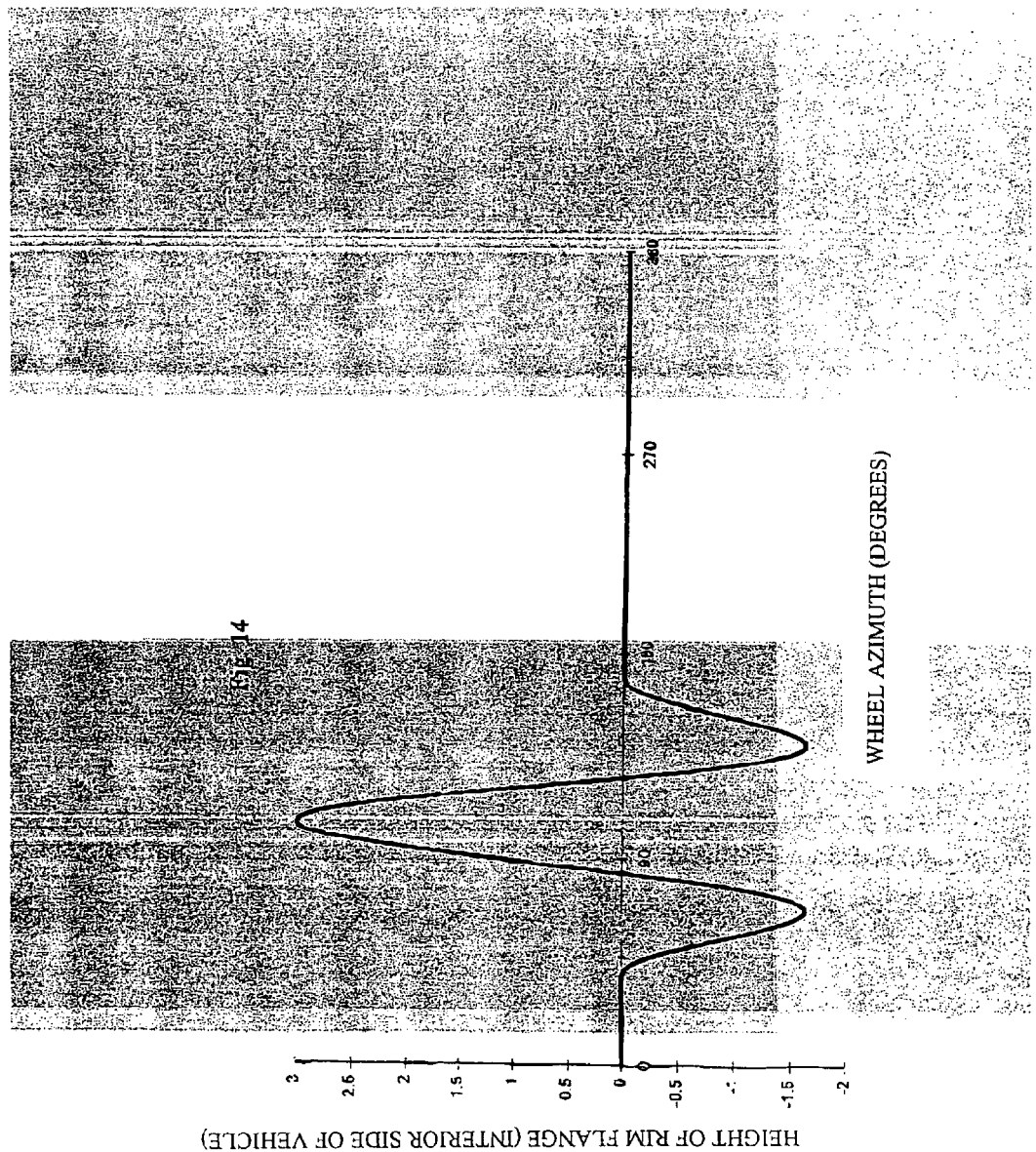

METHOD AND SYSTEM OF DETECTION OF A RUN-FLAT CONDITION OF A TIRE; INSERTS, WHEELS AND TIRES DESIGNED FOR SUCH METHOD AND SYSTEM

This is a continuation of PCT/EP99/04464, filed Jun. 28, 1999.

BACKGROUND OF INVENTION

The invention concerns a method and a system of detection of a run-flat condition of a vehicle tire as well as tires, wheels and safety inserts designed to facilitate that detection.

When a mounted assembly—tire and wheel assembly—contains means of support for the tire tread in case of running flat, which means of support make it possible to avoid a forced stop of the tire in case of serious loss of air pressure in the tire. Those means of support can be a safety insert placed radially outside the rim of the wheel of the mounted assembly or reinforcing elements placed inside the structure of the tire sidewalls and/or beads. Such tires are called "self-supporting" tires.

The bearing of the tire on those means of support is accompanied by a more or less marked degradation of its performance, which may not be perceptible to the driver through the behavior and comfort of the vehicle. Furthermore, the operating lifetime of those means of support is limited. It is therefore useful for the driver to be alerted as soon as a tire bears on its means of support so that he can follow the manufacturer's instructions.

Patent application WO 94/03338 proposes a system of detection of the bearing of a tire on a safety insert. That system comprises one accelerometer per wheel, placed on one of the suspension elements of the wheel and measuring the vertical accelerations linked to a central processing unit. The analysis is based on detection of the appearance, upon bearing, of a resonance mode of the system consisting of the tire bearing on the safety insert, of the unsuspended weights and of the suspension springs. That resonance mode is characteristic of running flat and is situated above 100 hertz.

However, for some safety supports, made, for example of elastomeric material, the sensitivity of the aforesaid analysis may prove insufficient.

In the case of mounted assemblies not containing the aforesaid means of support, on a run-flat condition, the tread bears on the beads and the rim flanges. That can result in a rapid deterioration of the tire and movement of the beads into the rim mounting groove, not to mention degradation in the behavior of the vehicle. As soon as such a support comes into play, it is also very useful to alert the driver.

In what follows, the "run-flat condition" of a tire means running when the air pressure in the tire is no longer sufficient to guarantee that the tire will carry the load of the tire. The tire tread then bears on the support elements. Those support elements can be provided for that purposes (such as safety inserts arranged around the rim or rim flanges).

SUMMARY OF THE INVENTION

The obdfject of the invention is a method of detection of a run-flat condition of a vehicle tire, the tire being mounted on a wheel, the sensitivity and reliability of which are improved.

The method of detection according to the invention is such that:

a quantity $f(\alpha, t)$ is sensed, which varies with the angular displacement of the wheel in time;
measuring signals are developed from that quantity, which vary with the angular speed of the wheel $d\alpha(t)/dt$;
a quantity characteristic of the dispersion of measuring signals is calculated;
an alarm is set off when the characteristic quantity satisfies a given ratio.

The characteristic quantity can simply be the value of the standard deviation of the measuring signals.

Advantageously, in order to determine the characteristic quantity of dispersion of the measuring signals:

the rotation frequency of the wheel is determined;
the energy of the measuring signals is calculated in at least one narrow frequency band centered on one of the first harmonics of said rotation frequency; and
an alarm is set off when said energy satisfies a given ratio.

The rotation frequency of the wheel can be determined from the measuring signals.

It has been surprisingly observed that analysis of the dispersion of the rotation speeds of the wheels reveals notable changes on a run-flat condition of a tire, that is, when the tread bears on any support element. That method has the advantage of not necessitating, as in previously known methods, specific sensors such as accelerometers, but can rather use simple measurement of angular rotation of the wheels. Those measurements are often already available, as in the case of vehicles equipped with antilock devices on the wheels.

Furthermore, upon bearing of the tread of a tire in run-flat condition on any support element, that method of detection is very sensitive and very reliable, because the applicant observed that the energy of the measuring signals varies preferably in the frequency bands centered on the different harmonics of the turn of a wheel.

That method of detection analyzes preferably the development of energy of the spectrum of speeds in at least two narrow frequency bands centered on harmonics of the turn of a wheel, with the exception of harmonic 1.

Advantageously, after having detected that the sum of the energies of the measuring signals in at least two narrow frequency bands centered on one of the first harmonics satisfies a given ratio, the energy of the measuring signals is compared in each of those frequency bands to a given corresponding threshold and an alarm is set off when, for at least two of those frequency bands, the energy of the signals is higher than the corresponding threshold.

That supplementary test has the advantage of limiting the influence of possible disturbances, such as those due to engine vibrations. In fact, such disturbances are usually limited to a single frequency band.

The analysis can be conducted wheel by wheel or by comparing the wheels with each other. Wheel by wheel comparison has the advantage of making it possible to identify the tire in run-flat condition. On the other hand, comparison among several tires makes detection more reliable. The analysis can also use measuring signals which vary with angular acceleration of the wheels $d^2\alpha(t)/dt$.

To avoid false alarms, it is advantageous also to follow the development of energy of the measuring signals in at least a second frequency band where the measuring signals are substantially independent of the run-flat condition and of not setting off an alarm when the measuring energy in those second frequency bands exceeds a given threshold.

Such second frequency bands are preferably situated outside the multiple frequencies of the wheel rotation frequencies.

An alarm can also fail to be set off when the speed of the vehicle is below a given threshold.

The invention also concerns a system of detection of a run-flat condition of a vehicle tire, the tire being mounted on a wheel, comprising:

first means for sensing a quantity $f(\alpha,t)$ which varies with the angular displacement of the wheel in time,
second means for elaborating measuring signals which vary with the angular speed of the wheel $d\alpha(t)/dt$, calculating a characteristic quantity of dispersion of the measuring signals and setting off an alarm when said characteristic quantity satisfies a given ratio;
third means for transmitting that alarm to the driver of the vehicle; and
fourth means arranged in the mounted tire/wheel assembly to generate vibrating warning signals on a run-flat condition of the tire.

The vibrating warning signals can advantageously generate at least one sinusoidal function, the period of which is a submultiple of a turn of the wheel. Such signals are easily detected by the system according to the invention, even in case those means appreciably generate only a single sinusoidal function, the period of which is a submultiple of a turn of the wheel.

Those warning means can belong to the tire, to the wheel or to a safety insert placed radially outside the wheel.

The invention also concerns a safety insert intended to cooperate with the aforesaid detection method in order to offer a reliable detection of any run-flat condition of the tire.

The safety insert according to the invention, intended to be radially mounted outside the rim of said wheel, contains on its radially outer surface axially oriented bars. That safety insert is characterized in that those bars have sides whose inclination from normal to the tread in the longitudinal direction varies as a function of azimuth in order to generate vibrating warning signals on running in a run-flat condition. Those warning signals reinforce, on running flat, rotation speed fluctuations of the wheel.

Preferably, the longitudinal inclination according to the azimuth is at least a sinusoidal function, the period of which is a submultiple of a turn of the insert. That has the advantage of generating running speed variations specifically at harmonic frequencies of a turn of the wheel of the insert and, therefore, of being very easily detected by the aforesaid detection method with great reliability.

The invention also concerns a tire intended to equip a wheel, the tire containing a tread, two sidewalls and two beads as well as support elements intended to support the tread in case of run-flat condition. That tire is characterized in that the support elements contain means for generating vibrating warning signals on a run-flat condition.

The means for generating those vibrating warning signals preferably entail a variation as a function of azimuth of the radius under load of the tire on running with a tire deflection above a given threshold. That variation as a function of azimuth of the radius under load of the tire is advantageously a sinusoidal function, the period of which is a submultiple of a turn of the insert.

The invention concerns, finally, a wheel intended to receive a tire, characterized in that it contains means for generating vibrating warning signals of a run-flat condition of the tire.

Those means can be a variation as a function of the azimuth of the radial height of least one of its flanges. That variation can be obtained by the addition of an extra part at least partially covering the radial end of the flanges.

As previously, the variation of radial height as a function of azimuth is at least a sinusoidal function, the period of which is a submultiple of a turn of the insert.

Several embodiments are now described nonlimitatively by means of the accompanying drawings.

DESCRIPTION OF THE DRAWINGS

FIG. 14 represents the course as a function of azimuth of the radial height of the interior flange of the wheel of FIGS. 12 and 13.

DESCRIPTION OF PREFERRED EMBODIMENTS

Figure 1:
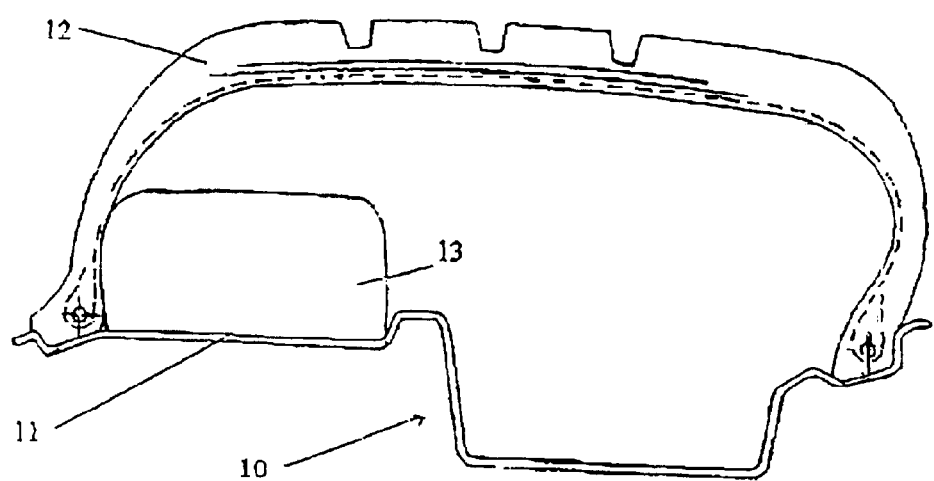
FIG. 1 represents, in axial section, a mounted assembly equipped with a safety insert.

FIG. 1 shows a wheel rim 10 equipped with an annular safety insert 13 resting on the bearing 11 of the rim 10. The particular geometry of that wheel rim 10 is described in French patent application No. 2,713,558. It represents two bead seats of different diameters and is particularly adapted for easy placement of that safety insert 13. This assembly makes running possible in spite of a considerable pressure drop in the tire 12. In the case of such running, the interior of the deformed tire rubs on the outer surface of the insert, producing heat which limits the radius of action available; it is therefore important for the driver to be informed as soon as a tire bears on its insert 13.

For that purpose, a safety insert containing means for generating harmonic vibrating warning signals of the turn of the wheel (that is, of the rotation frequency of the tire) is advantageously used as insert.

Figure 2A:
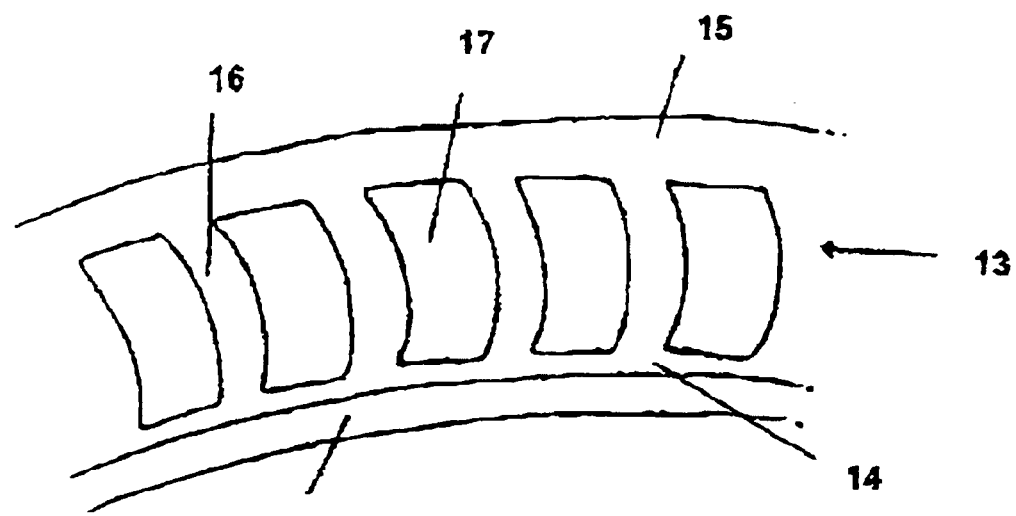
FIGS. 2a and 2b schematically represent, in side view, a first embodiment of a safety insert according to the invention.
Figure 2B:
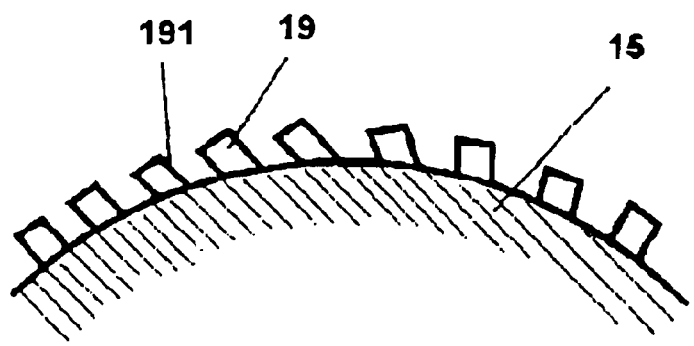

The insert shown on FIGS. 2a and b is made of soft elastomeric material. It contains a generally ring-shaped base 14, reinforced by a ply (not represented) longitudinally oriented roughly at 0°, a generally ring-shaped crown 15 with axial bars 19 on its radially outer wall (FIG. 2b) and arched walls 16. Between walls 16 there are recesses 17 which can axially cross the insert 13 completely or partly. The base can contain an abutment 18 to be placed on the outer side next to the tire bead.

Figure 3:
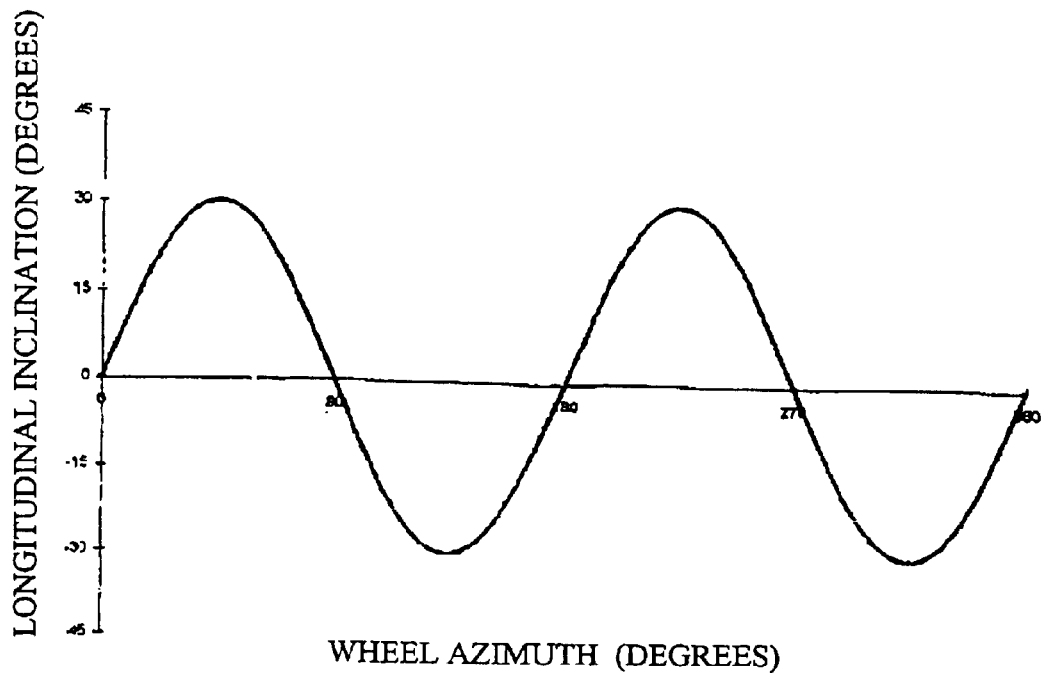
FIG. 3 represents the course of the longitudinal inclination of axial bars of the insert of FIG. 2b as a function of the azimuth.

The axial orientation bars 19 have sides 191 whose inclination from normal to the tread in the longitudinal direction varies as a function of azimuth, as represented on FIG. 3. That inclination follows a roughly sinusoidal course submultiple of order 2 of the turn of the insert. On running flat on the insert, the bars supporting the tire will be crushed with a slight longitudinal displacement of amplitude and direction variable with the inclination of those bars. That displacement will be transmitted to the tire by adherence between the insert and the inner surface of the tire and results in the appearance of instantaneous rotation speed fluctuations of the mounted assembly and, therefore, of the wheel. Those fluctuations will, in the present case, preferably be centered on harmonic 2 of the spectrum of wheel rotation speeds. Such an insert therefore comprises an example of means for generating rotation speed variations of the wheel it equips on running flat.

A similar result can be obtained by varying the radial stiffness of the insert as a function of the azimuth or its radius.

Figure 4:
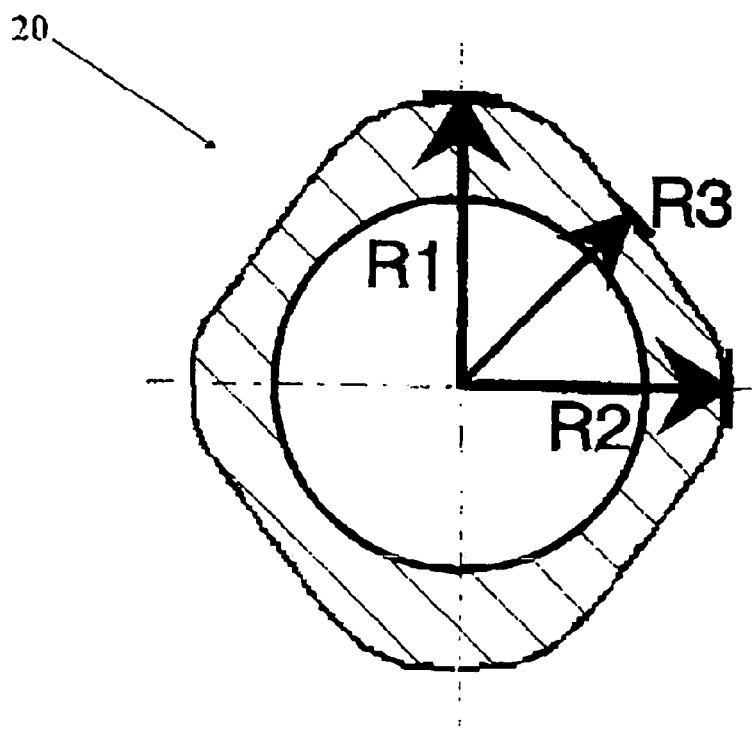
FIG. 4 represents, in meridian section, a diagram of a second insert with an outer radius variation.

FIG. 4 represents a diagram of an insert 20 having a variation of outer radius among three values R1, R2 and R3 such that R1>R2>R3 with a progressive variation of that radius between maxima and minima. The two zones of outer radii R1 are at 180° from one another and so are the two zones of radii R2; the four minima of radii R3 are each between two maxima R1 and R2. This result, on running flat, in a variation of that radus as a function of α with two fundamental harmonics, the first of frequency 2, due to the first two maxima of radus R1 and the second of frequency 4 due to the presence of the four maxima of radius R1 and R2 and of the four minima of radius R3. In that example, the R1–R3 difference is equal to 5 mm and the R2–R1 difference is equal to 3 mm.

Figure 5:
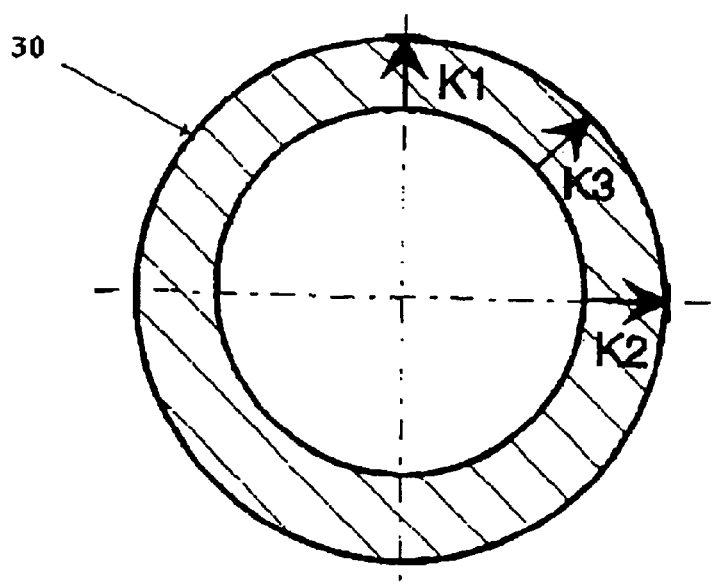
FIG. 5 represents, in meridian section, a diagram of a third insert with a radial stiffness variation.

FIG. 5 represents a diagram of an insert 30 which has a variation of radial stiffness among three values K1, K2 and K3, such that K1>K2>K3, with a progressive variation of that stiffness between the maxima and the minima. As previously, the two zones of stiffness K1 are at 180° from one another and so are the two zones of stiffness K2; the four minima of stiffness K3 are each between two maxima K1 and K2. This results, on running flat, in a variation of that stiffness as a function of a with two fundamental harmonics, the first of frequency 2, due to the first two maxima of stiffness K1 and the second of frequency 4 due to the presence of the four maxima of stiffness K1 and K2 and of the four minima of stiffness K3.

Figure 6:
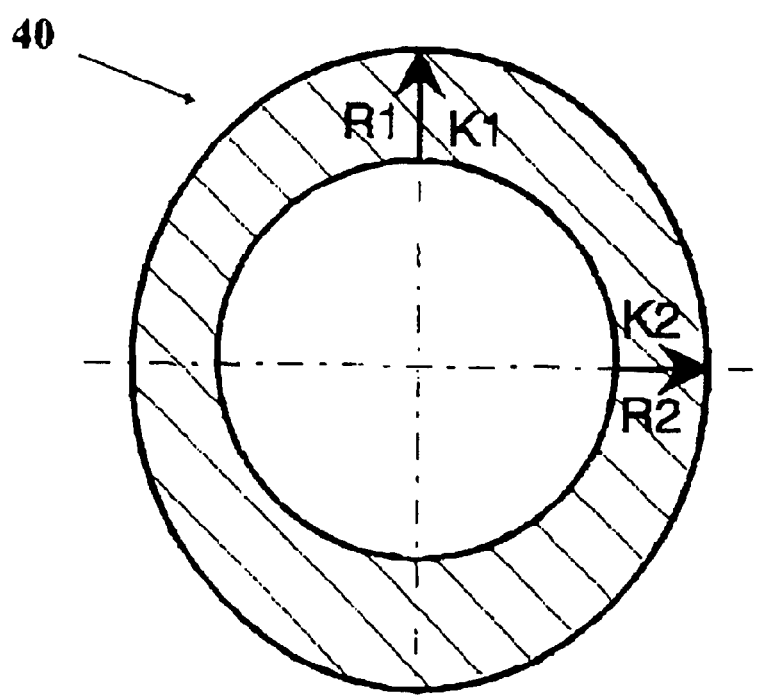
FIG. 6 represents, in meridian section, a diagram of a fourth insert with a combination of radial stiffness and outer radius variations.

FIG. 6 represents a diagram of an insert 40 presenting a combination of a variation of outer radius and a variation of radial thickness. Each characteristic presents two maxima (R1, K2 respectively) and two minima (R2, K1 respectively), shifted angularly by 90° from one another. The radial thickness maxima are sufficiently localized to produce on the insert 40 assembly a crushed radius variation on bearing with four maxima.

Consequently, that insert also produces an harmonic excitation concentrated on harmonics 2 and 4, but presents the advantage of having a weighting variable as a function of speed. The applicant observed, in fact, that the radial variations of stiffness were more perceptible at low speed and that the outer radius variations were more perceptible at high speed.

Figure 7:
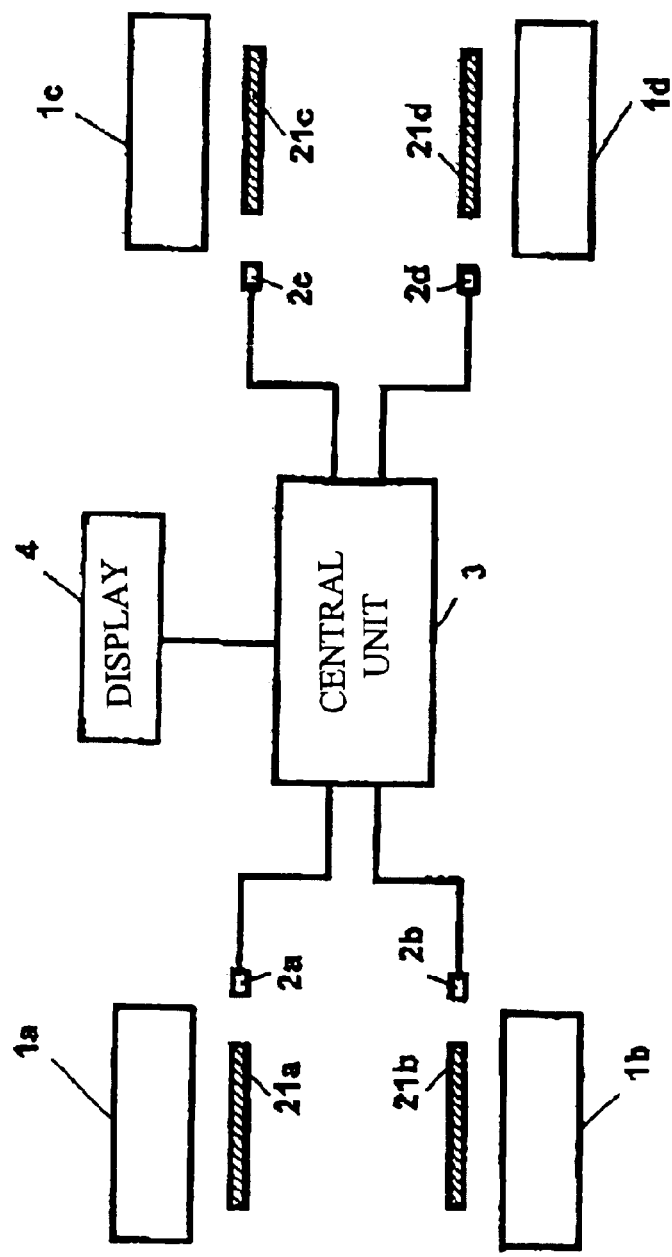
FIG. 7 schematically represents a detection system according to the invention.

FIG. 7 represents a vehicle equipped with a system of detection of a run-flat condition according to the invention. The vehicle contains four wheels 1a, 1b, 1c and 1d equipped with tires. Each mounted assembly (tire and wheel) contains means for generating vibrating warning signals on running-flat of the tire, for example, one of the safety inserts presented in FIGS. 2 to 6. Close to each tire there is a sensor of angular displacement 2a, 2b, 2c and 2d of the wheel concerned. Each sensor is coupled to a notched disk 21a, 21b, 21c and 21d respectively, as well known. The notched disks 21a, 21b, 21c and 21d are made of magnetic disks attached coaxially with the corresponding wheels. The sensors 2a, 2b, 2c and 2d are placed close to the notched disks 21a, 21b, 21c and 21d at such distance that rotation of the notched disk near the sensor creates a signal variable with the angular displacement of the notched disk. The average frequency of that signal gives the angular rotation speed of the wheel. The variable signal of each sensor 21, 2b, 2c and 2d is entered in a central unit 3. The central unit 3 comprises a signal analyzer which analyzes those signals. The result of the analysis is transmitted to a display 4 in order to inform the driver of the vehicle when a roll-flat condition of a tire is detected.

When the vehicle is equipped with a wheel antilock device, the aforesaid sensors 2 and the central unit 3 can be those of the antilock device. Under these conditions, all of the stages of the method according to the invention can be ensured by specific software incorporated in the computer of the antilock device. It is advisable to provide a suitable display 4.

Figure 8:
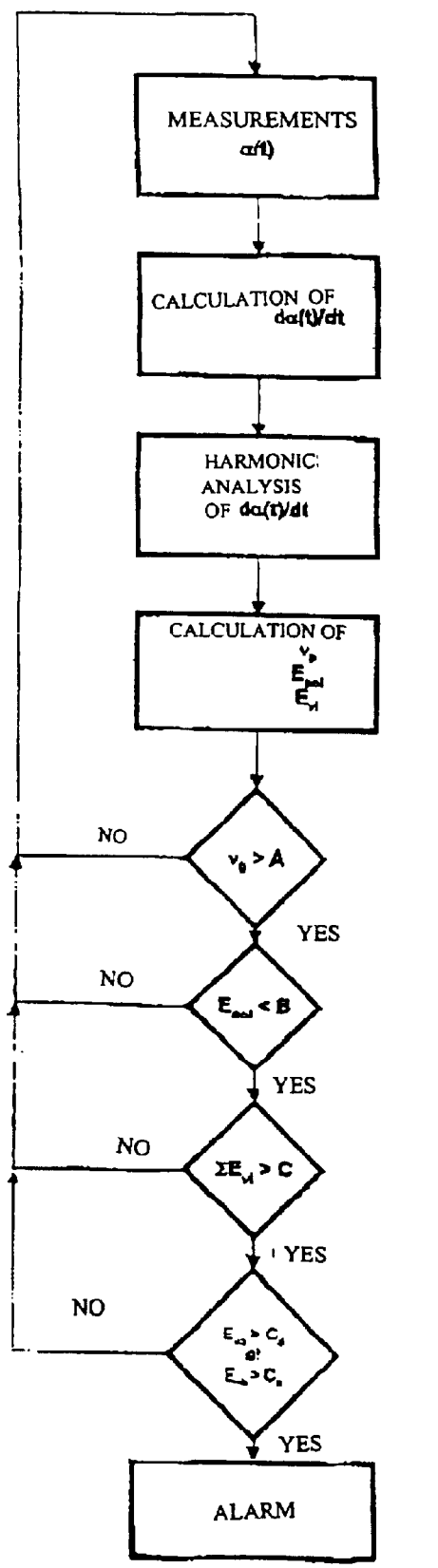
FIG. 8 represents a general diagram of the method of detection according to the invention.

FIG. 8 represents a general diagram of the method of detection according to the invention. From the measurements f(α,t) of the sensors 2a, 2b, 2c and 2d, the central unit 3 performs the following operations for each wheel:

calculating dα(t)/dt corresponding to the angular rotation speed of the wheel;
performing an harmonic analysis of dα(t)/dt by known means, for example, with a Fourier transform, in order to obtain dα(v)/dv (see FIG. 9);
determining the angular rotation speed of the wheel $v_0$, corresponding to the frequency of harmonic 1;
determining the energy $E_{sol}$ of the spectrum of speeds dα(v)/αv in a frequency band not including an harmonic of the turn of the wheel, for example, between harmonics 5 and 6;
determining the energies of the spectrum of speeds dα(v)/αv in two narrow bands of width in the order of 2 to 10 Hz centered on harmonics 2 to 4, namely, energies $E_{v2}$ and $E_{v4}$, and adding them in order to obtain $\Sigma E_{vi}$;
comparing $v_0$ to a threshold A, and if $v_0$ is lower than A, resuming the cycle of measurements;
if $v_0$ is higher than A, comparing $\Sigma E_{sol}$ to a threshold B, and if $E_{sol}$ is higher than B, resuming the cycle of measurements;
if $E_{sol}$ is lower than B, comparing $\Sigma E_{vi}$ to a threshold C; and
if $\Sigma E_{vi}$ is higher than C, setting off an alarm, unless resuming the cycle.

For each harmonic analyzed, a suitably programmed microprocessor calculates the energy of the harmonic by the integral of the peak emerging from the background noise, the background noise being determined from a frequency band encompassing the narrow band analyzed.

Value $\Sigma E_{vi}$ is a function of the speed of the vehicle and of the energy level of the spectrum of speeds linked to the unevenness of the road. Several values of threshold C can thus advantageously be used as a function of speed of the vehicle and of the value of $E_{sol}$.

The first test using $v_0$ entails not setting off any alarm when the rotation speed of the wheel and, therefore, the speed of the vehicle is less than a given threshold, in the order of 20 to 30 km/h.

The second test also entails neutralizing the alarms when the energy $E_{sol}$ is higher than threshold B, that is, when the unevenness of the road is very great and thus likely to disturb the measurements markedly.

Those two tests make it possible to limit the number of false alarms very appreciably.

As it is always possible for one or more peaks to be disturbed by other sources, for example, by engine vibrations, it is useful to complete that overall energy analysis by verifying that at least two of the harmonics analyzed have had a significant energy evolution. That additional step appreciably improves the reliability of detection.

Figure 9:
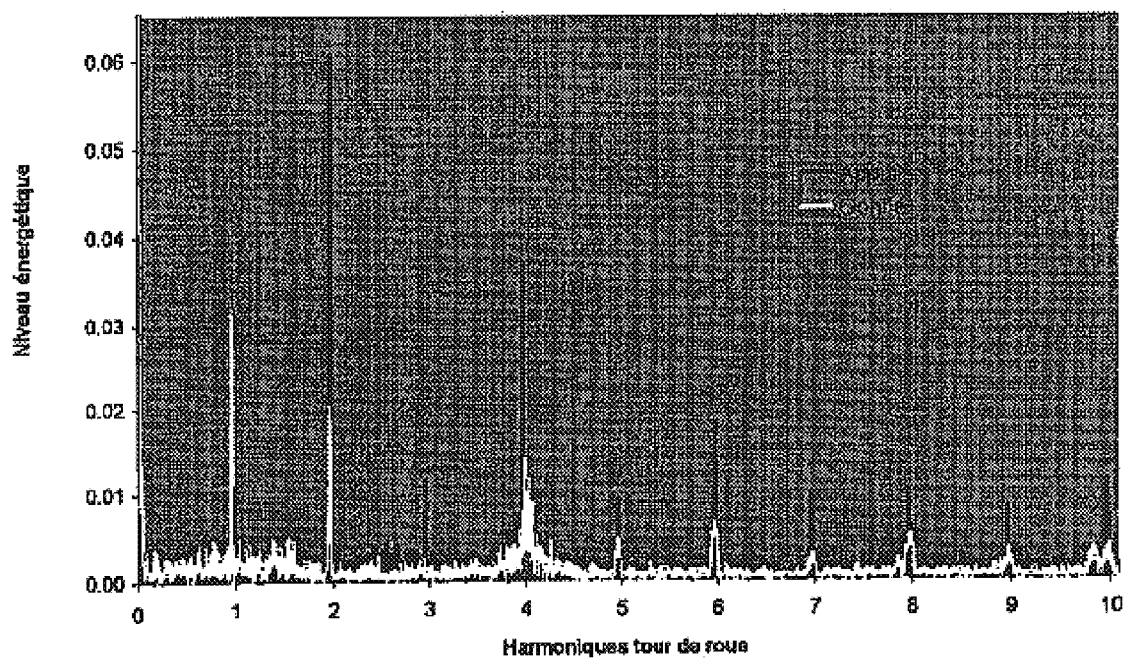
FIG. 9 represents two spectra of measuring signals as a function of frequency in inflated and run-flat condition on an ordinary road.

FIG. 9 represents an example of a spectrum of speeds of the wheels on running at normal inflation pressure (white curve) and in run-flat condition bearing on a safety insert (black curve). The vehicle is a Peugeot 405, running at 70 km/h on a standard course. The tire 12, considered in run-flat condition, is supported on the radially outer wall of a standard safety insert not containing means generating warning signals arranged around the rim of the wheel. Such an insert is described in patent application EP 0 796 747.

The white curve (running at normal inflation pressure) presents a notable maximum centered on harmonic 1. That explains why it is preferable to exclude that harmonic in analysis of the spectrum of wheel vibrations.

The black curve (running flat) presents substantially higher energy levels for each harmonic starting from harmonic 2. That well illustrates the effectiveness of analysis of harmonic 2 and 4 in order to detect a run-flat condition of the tire.

The method of detection according to the invention is already effective when the tire is supported on a safety insert not generating vibrating warning signals. But that method is particularly well suited for detecting a support on inserts containing such warning means and, notably, means generating harmonic signals of the turn of the wheel.

Figure 10:
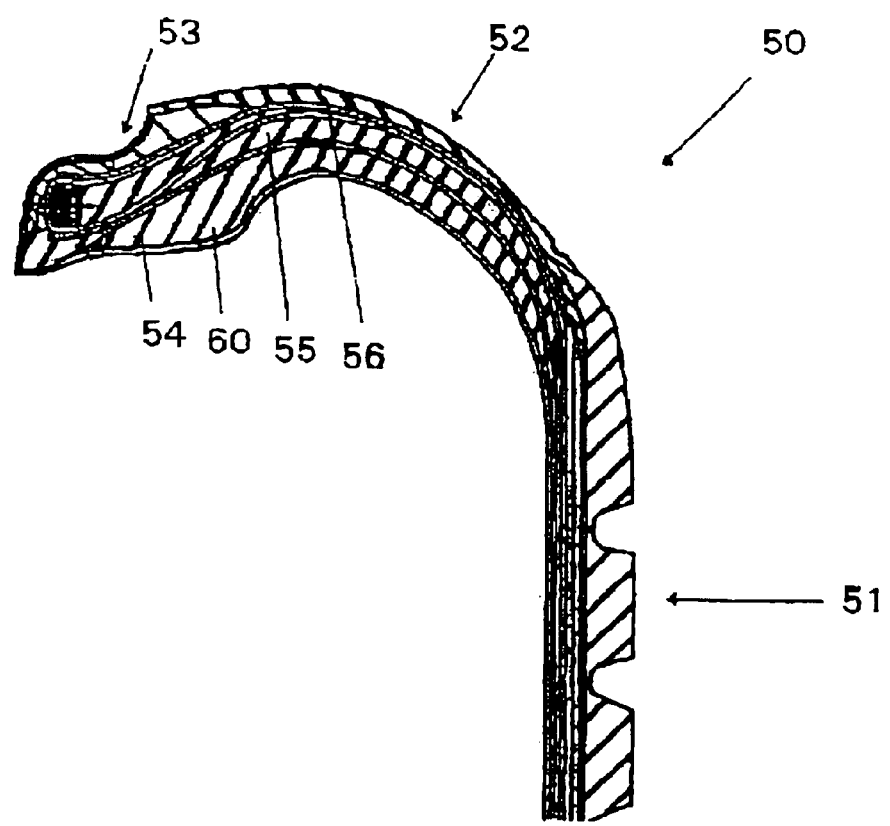
FIG. 10 represents, in axial half-section, a tire according to the invention.

The invention also concerns a tire 50 (FIG. 10) equipped with means 60 generating vibrating warning signals on running at camber higher than a given threshold.

That tire 50 contains a crown 51, a sidewall 52 and a bead 53. The sidewall 52 and the bead 53 are equipped with inserts 54, 55, 56 enabling that tire to support its load on running at zero inflation pressure.

Figure 11:
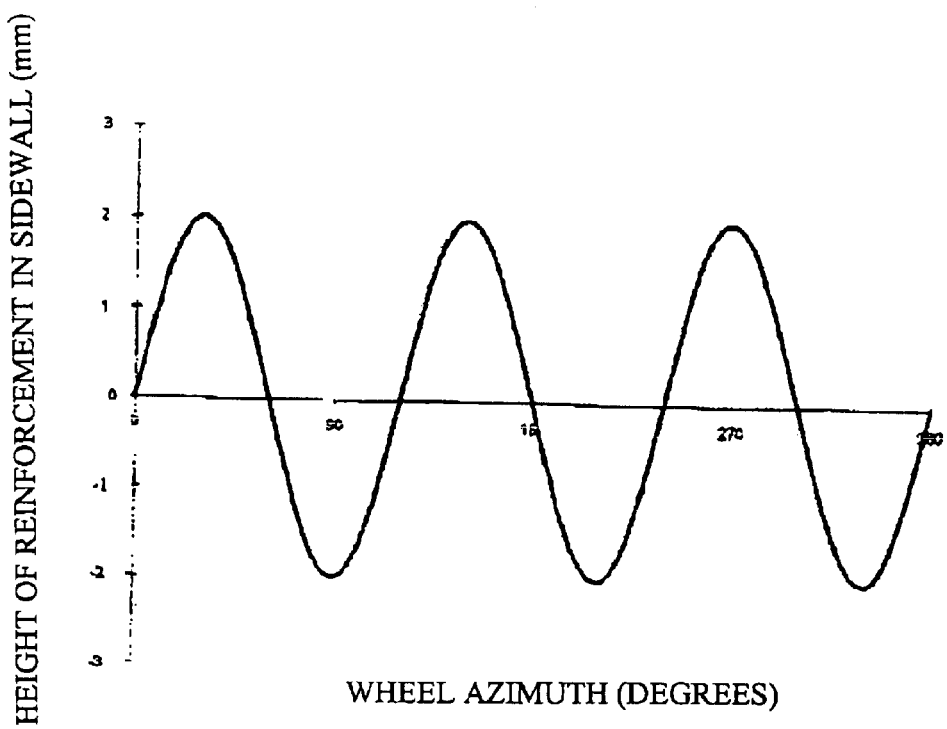
FIG. 11 represents the course as a function of azimuth of the radial height of a tire reinforcement.

The insert 54 contains a reinforcement 60 in the bead and sidewall, the radial height of which varies according to an harmonic function of the azimuth, as shown on FIG. 11. That reinforcement 60 will result, on running at a tire deflection higher than a given threshold, in a variation of radius under load of the tire and in the appearance of a multiple harmonic signal of the turn of the wheel detectable by the system and method previously described. The reinforcement 60 can be placed on both sides of the tire or on only one side. In the latter case, it is preferable for it to be the inner side in order not to degrade the behavior of the tire on turning. That also has the advantage of not setting off an untimely alarm on turns taken at high speed.

Figure 12:
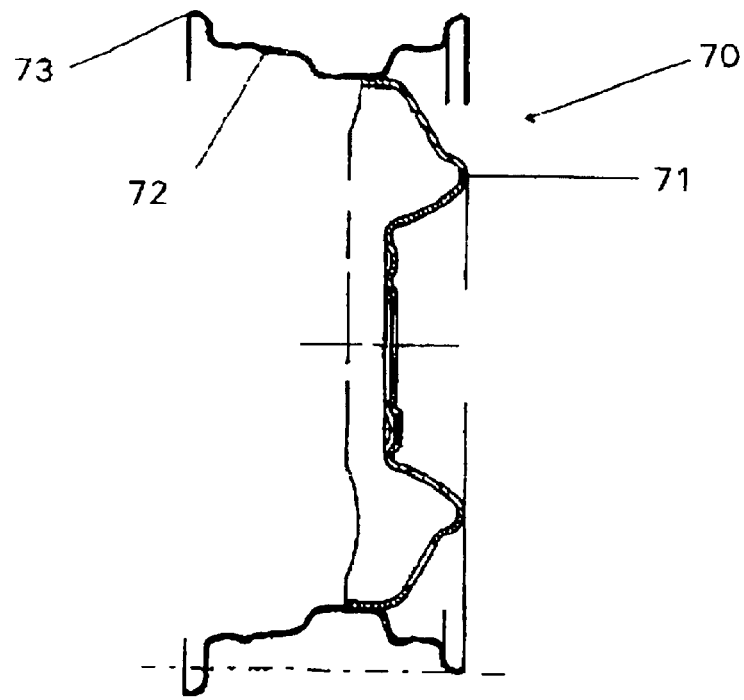
FIG. 12 represents, in axial section, a wheel according to the invention.
Figure 13:
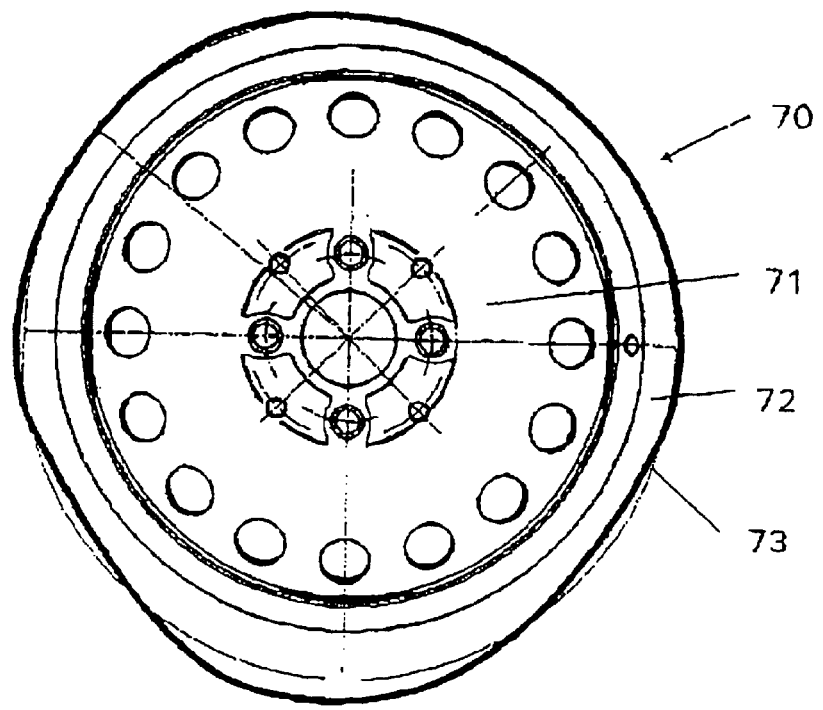
FIG. 13 represents, in interior side view, the wheel of FIG. 9.

FIGS. 12 and 13 represent a wheel 70 having a disk 71 and a rim 72 equipped with means for generating vibrating warning signals on running flat.

The rim 72 contains an interior flange 73. The radial height of that interior flange 73 varies as a function of its azimuth according to a law presented on FIG. 14. The variation involves less than half the circumference.

The variation of radial height of the rim flange can also be obtained by fastening a complementary part.

Consequently, when the wheel 70 is equipped with an ordinary tire under a load or with an inflation pressure such that the deflection taken by the tire is higher than in normal conditions of use, the radial variation of height of the interior flange will result in the appearance of vibrating warning signals. Those signals can be detected by the system or method previously described.

On running under normal load and inflation pressure conditions of the tire and, therefore, of tire deflection, modification of the rim flange of FIGS. 12 and 13 only results in a minimal modification of the bearing conditions of the bead on the interior flange.

As previously, it is important to arrange that variation of radial height of the flange on the interior flange in order not to disturb performance of the tire on a turn and to favor detection on running in a straight line.

I claim:

1. A method of detection of a run-flat condition of a vehicle tire, said tire being mounted on a wheel, wherein:
   a quantity $f(\alpha, t)$ is sensed, which varies with the angular displacement of the wheel in time;
   measuring signals are developed from that quantity, which vary with the angular speed of the wheel $d\alpha(t)/dt$;
   a quantity characteristic of the dispersion of measuring signals is calculated;
   an alarm is set off when the characteristic quantity satisfies a given ratio.

2. A method of detection according to claim 1, in which said characteristic quantity is the value of the standard deviation of said measuring signals.

3. A method of detection according to claim 1, in which, in order to calculate the characteristic quantity of dispersion of the measuring signals:
   the rotation frequency of the wheel is determined;
   the energy of the measuring signals is calculated in at least one narrow frequency band centered on one of the first harmonics of said rotation frequency; and
   an alarm is set off when said energy satisfies a given ratio.

4. A method of detection according to claim 3, in which the rotation frequency of the wheel is determined from said measuring signals.

5. A method of detection according to claim 3, in which the energy of said measuring signals is calculated in at least two narrow frequency bands, each centered on one of the first harmonics of the rotation frequency of said wheel, with the exception of the first harmonic.

6. A method of detection according to claim 3, in which, after having detected that the sum of the energies of the measuring signals in at least two narrow frequency bands centered on one of the first harmonics satisfies a given ratio, the energy of the measuring, signals is compared in each of said frequency bands to a given corresponding threshold and an alarm is set off when, for at least two of said frequency bands, the energy of the signals is higher than said corresponding threshold.

7. A method according to claim 3, including comparing the energy or energies of the measuring signals of the wheel of said tire with the energy or energies of the measuring signals of at least one of the other tires of the vehicle and an alarm is set off when the result of the comparison satisfies a given ratio.

8. A method of detection according to claim 3, in which measuring signals are developed which vary with the angular acceleration of the wheel $d^2\alpha(t)/dt^2$.

9. A method of detection according to claim 3, in which said narrow frequency band or bands has a width less than or equal to 10 hertz.

10. A method of detection according to claim 3, in which the energy of said measuring signals is further calculated in at least a second frequency band, where the measuring signals are substantially independent of the run-flat condition of said tire and no alarm is set off when the measuring energy in said second frequency bands exceeds a given threshold.

11. A method of detection according to claim 10, in which said second frequency bands are situated outside the multiple frequencies of the rotation frequency of said wheel.

12. A method of detection according to claim 1, in which no alarm is set off when the speed of said vehicle is below a given threshold.

13. A method of detection according to claim 1, in which the location of the tire in run-flat condition is identified and transmitted to the driver of the vehicle.

14. A method of detection according to claim 1, in which, a vehicle containing a wheel antilock device, the measuring signals are developed from sensors of said wheel antilock device.

* * * * *